J. T. HALSEY.
CAR TRUCK.
APPLICATION FILED NOV. 4, 1912.
1,106,331.
Patented Aug. 4, 1914.
3 SHEETS—SHEET 1.
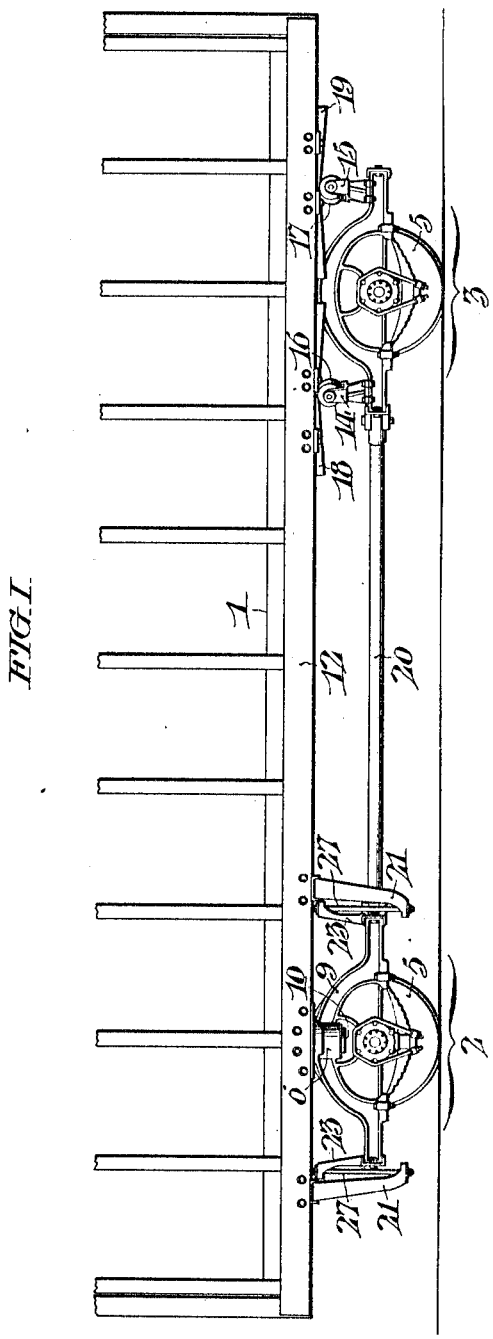
Witnesses
John C. Bergner
James H. Bell
Inventor
James T. Halsey,
By Haly & Paul
Attorneys J. T. HALSEY.
CAR TRUCK.
APPLICATION FILED NOV. 4, 1912.
1,106,331.
Patented Aug. 4, 1914.
3 SHEETS—SHEET 2.
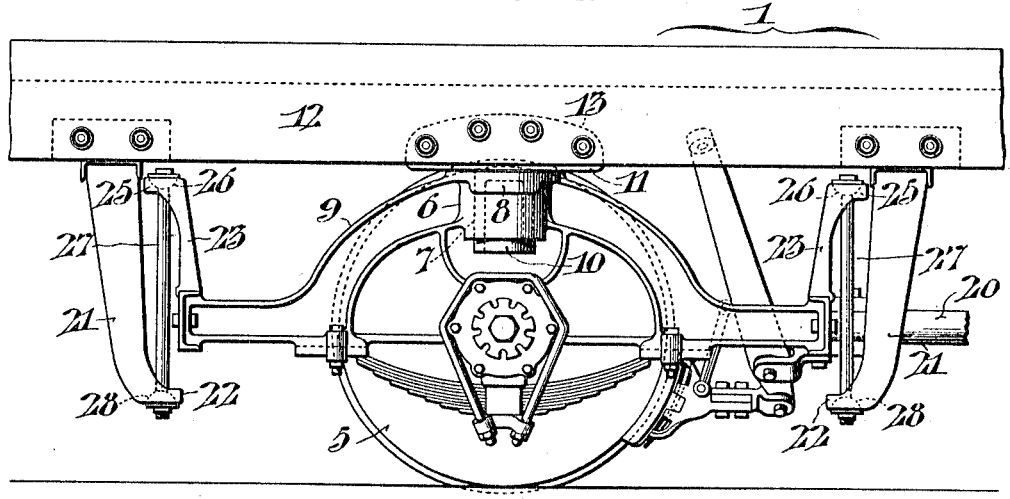
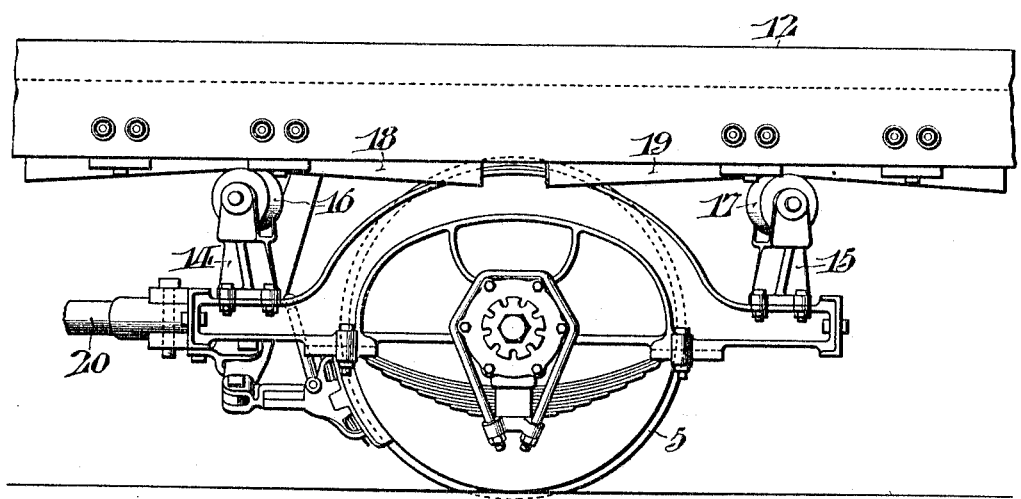
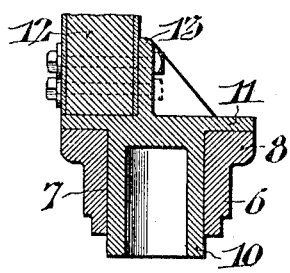
Inventor
James T. Halsey J. T. HALSEY.
CAR TRUCK.
APPLICATION FILED NOV. 4, 1912.
1,106,331.
Patented Aug. 4, 1914.
3 SHEETS—SHEET 3.
FIG. V.
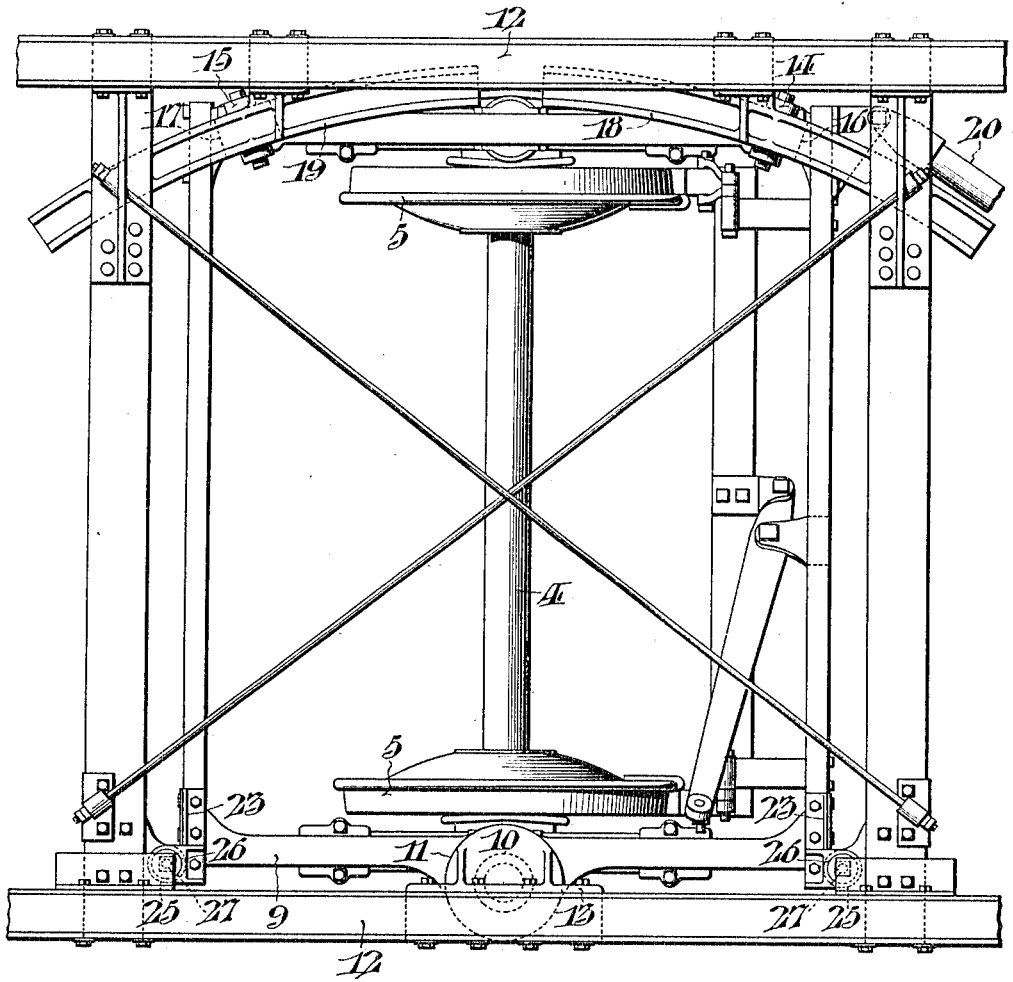
Inventor
James T. Halsey.
Witnesses
Attorneys

UNITED STATES PATENT OFFICE.

JAMES T. HALSEY, OF PHILADELPHIA, PENNSYLVANIA, ASSIGNOR TO PHILADELPHIA HOLDING COMPANY, OF PHILADELPHIA, PENNSYLVANIA, A CORPORATION OF DELAWARE.

CAR-TRUCK.

1,106,331.   Specification of Letters Patent.   Patented Aug. 4, 1914.

Application filed November 4, 1912.  Serial No. 729,314.

*To all whom it may concern:*

Be it known that I, JAMES T. HALSEY, of Philadelphia, in the county of Philadelphia and State of Pennsylvania, have invented certain new and useful Improvements in Car-Trucks, whereof the following is a specification, reference being had to the accompanying drawings.

The invention relates more particularly to a device for facilitating the travel of a car upon curved portions of a track by permitting and insuring such movements of the wheels and axles, relative to the car-body, as will tend to minimize undesirable resistance between the wheel flanges and the rails. In my co-pending application, Serial No. 607,290, filed February 8th, 1911, I have disclosed devices of this general character, wherein the supporting means, which intervenes between the car-body and the axles, or trucks, includes pivotal supports located at a lateral distance from the median plane between the wheels carried by each axle, and on opposite sides of said plane, and also includes traveling supports located respectively on the free, or non-pivotal sides. This system permits the axles, or trucks, to move relatively to the car-body about substantially definite vertical axes located at a distance laterally from said median plane, said vertical axes for the respective axles or trucks being on opposite sides of said median plane, but in the specific organization shown and described in detail in said application, it is evident that at the pivoted side of each truck, the car-body has only a relatively limited support against gravity, namely, directly at or immediately around the pivotal connection itself.

An object of the present invention is to provide auxiliary supporting means which is separate from the pivotal support, but located on the same side of the median plane as the pivotal support, which auxiliary supporting means prevents any objectionable rocking movements of the car-body on said pivotal support, without interfering with the rotative movements of the car-body relative to the axle or truck on said pivotal support.

In the accompanying drawings, which show a convenient embodiment of the invention, Figure I, is a partial side elevation of a car-body provided with trucks of the character referred to, and provided with my improved intervening supporting means between the car-body and the trucks. Fig. II, is a side elevation of one of the trucks with my improved supporting means applied thereto. Fig. III, is a side elevation of the opposite side of the truck. Fig. IV, is a detail view, showing, in vertical section, a preferred form of the pivotal supporting connection, which intervenes between the car-body and the truck. Fig. V, is a top plan view of one of the trucks, also showing a part of the underframe of the car.

The car-body may be of any desired construction and includes an underframe 1, which is supported by car trucks 2, and 3. The construction of these trucks is similar throughout, the relative positions of certain parts being merely reversed with relation to the sides of the car, and hence it will be only necessary to describe one of them in detail. The truck, in the embodiment herein shown, is provided with a single axle 4, and a pair of wheels 5. The axle is supported in the usual journal boxes, and the organization includes springs and brake mechanism or other adjuncts which it is deemed unnecessary to describe, as these features are not in any way directly related to the present invention.

Referring more particularly to Figs. II, and IV, it will be noted that the truck 2, is provided upon the side which is nearest to the observer, with a hollow bearing 6. This bearing 6, has a vertical cylindrical opening 7, (see Fig. IV), surrounded by an outwardly projecting annular flange 8, which part may be cast integrally with the rigid side piece 9, of the truck. Said bearing is adapted to freely receive a vertical supporting pivot 10, having an annular flange 11, which bears upon the flange 8. The side beam 12, of the underframe rests upon a portion of the flange 11, and the latter, with its pivot, is rigidly attached to said beam 12, by means of the upwardly extending face plate 13, which is bolted to the side of the beam.

The axis of the pivotal supporting connection, as will be apparent from Fig. V, is located at a substantial distance laterally from the longitudinal center of the axle. As a matter of preference in this particular embodiment, the pivot is arranged, as herein shown, above one extremity of said axle and beyond the outer face of the car wheel. This pivotal connection between the car-body and the truck permits each car-body and truck to swing with relation to one another around a substantially definite vertical axis located at a distance laterally from the median plane between the car wheels. At the side of the truck opposite to this pivotal connection, (and which may be termed the free, or non-pivoted side), I have provided a traveling support which intervenes between the car-body and the truck and which is adapted to sustain the car-body at that side of the truck, while permitting a swinging movement of the truck and axle, with relation to the car-body, about the axis of said pivotal connection.

Referring more particularly to Figs. III, and V, it will be noted that two uprights, 14 and 15, are rigidly mounted upon the side piece of the truck, and friction rollers 16, and 17, are mounted to turn freely in said upright supports respectively. These rollers are arranged beneath and run along two tracks, 18, and 19, respectively, having double inclined under surfaces, as shown, and preferably formed of a segmental flat bar secured upon the bottom of the side beam 12, of the underframe, so that the car-body rests at that region upon said friction rollers. The axes of said rollers should be arranged radially with relation to the axis of the pivotal support 6, upon the opposite side of the truck, and the segmental tracks 18, and 19, should be concentric with said axis.

As before stated, the two trucks 2, and 3, are counterparts in construction; the only difference of arrangement being that the positions of the pivotal supporting connection and traveling supports are reversed with relation to the median plane of the car wheels. These trucks are connected together by a rigid connecting link 20, (see Fig. I), which extends diagonally across the car-body and is pivotally attached to the trucks respectively at their free or non-pivoted sides. This link constitutes a means for correlating the movements of the trucks.

The above described parts are fully shown and described in my co-pending application above referred to, and further description thereof, and the operation of said devices is not thought necessary.

It will be apparent from the above description that there are substantially three points of support between each truck and the car-body; one point being at the pivot, and the other two points being at the friction rollers 16, and 17.

While the car-body thus has two points of support relatively to the truck, on one side of the median plane, the above described construction provides only one supporting point on the other side of said median plane. In order to avoid objectionable rocking movements of the car-body relative to the truck, or tilting of the truck, on that side of the median plane where the pivotal support of the truck is situated, I have provided auxiliary supporting devices, which form a part of the supporting means intervening between the car body and the truck, and these auxiliary supporting devices operate independently of the pivotal support to secure their supporting functions, while permitting the characteristic desired movements of the car-body relative to the truck about the axis of the pivotal support.

In the present embodiment of my invention the auxiliary supporting devices comprise two depending brackets 21, which are rigidly secured to the side beam, 12, of the underframe of the car body. The lower ends of said brackets are projected inward toward the truck, as indicated at 22, so as to underhang correlative upwardly extending brackets 23, rigidly mounted upon the truck. The upper ends of the brackets 23, are projected outward as indicated at 25, and thus overhang the lower ends of the brackets 21. In the upper faces of the lateral projections 25, on the brackets 23, are formed semi-spherical hollow seats or cups having apertures at the bottom, which seats are adapted to respectively receive correspondingly shaped washers or heads 26, carried at the upper end of links 27, which extend down through said apertures. The under faces of the projected parts 22, of the brackets 21, are formed with similarly shaped inverted cups or seats 28 having apertures at the top, which seats respectively receive correspondingly shaped washers or heads 29, carried at the lower ends of the links 27, which extend through said apertures.

The washers or heads 26, and 29, are preferably constructed as screw nuts, engaging with threaded portions of the respective extremities of the links, and hence can be adjusted, at the proper position. The faces of the brackets proximate to the links, at the regions immediately adjacent to the heads, are cut away or hollowed, to allow of a free but limited movement of the links, and the semi-spherical seats in the brackets provide a globe joint, or universal connection between the links and the brackets, which permits swinging movement of the parts in any direction relatively to one another.

By the above construction, part of the weight of the car-body may at all times be normally carried by the brackets 23, through the links 27, which connect them with the brackets 21. I have thus provided three normal points of support for the car-body with relation to the truck upon that side of the median plane at which the pivotal support is located, one of which points is at or immediately around the pivotal support itself, the other two points being at the brackets 21.

As swinging movement of the links occurs, more of the weight may be transferred thereto, thus relieving, to that extent, the support at or immediately around the pivot itself. Furthermore, any objectionable tilting, or rocking movement of the truck with relation to the pivot, is obviated, and thus there is no liability of binding at the pivot.

From the above description it will be apparent that I have provided a supporting means for the car-body intervening between said car-body and the truck, which includes a pivotal support having a substantially definite vertical axis located upon one side of the median plane and at a substantial distance therefrom, and which also includes an auxiliary support independent of the pivotal support and disposed on the same side of the median plane of the car wheels as the pivotal support, and which further includes two traveling supports upon the opposite side of the median plane, so that there may be five points of support between the car-body and the truck, when running upon a straight track.

It is obvious that the terms "car" and "car-body", as used in this description, comprehend broadly any wheeled vehicle which is adapted to run upon a railed track, and that the term "truck" is used as comprehending broadly any structure adapted to support the body of a car with relation to the axle of the car wheels irrespective of whether said truck includes a single axle and a pair of wheels or two axles and four wheels, and also irrespective of any particular character or details of the supporting structure of the truck.

It will be understood that in the boardest aspects of the invention I do not limit myself to the use of the specific elements described, nor do I limit myself to the particular arrangement of parts herein shown.

I claim:

1. The combination with a car-body, an axle, and a pair of wheels carried by said axle; of connecting means intervening between said car-body and the axle, said means including a pivotal member having a vertical axis located upon one side of the median plane between said wheels; a traveling support located upon the other side of said median plane; and a freely movable auxiliary support, independent of said pivotal member, and located upon the same side of said median plane as said pivotal member.

2. The combination, with a car-body, an axle and a pair of wheels carried by said axle; of connecting means intervening between the car-body and the axle, said means including a pivotal support having a vertical axis located upon one side of the median plane between the wheels carried by said axle; a traveling support on the other side of said median plane; and a freely movable auxiliary support independent of the pivotal support and located on the same side of said median plane as said pivotal support.

3. The combination with a car-body, an axle and a pair of wheels carried by said axle; of primary supporting means for the car-body intervening between said car-body and the axle, said means being adapted to permit a rotative movement of the car with relation to the axle about a fixed vertical axis located at a lateral distance from the median plane between the wheels carried by the axle; and an auxiliary supporting device intervening between the car-body and the axle, said auxiliary supporting device being independent of the primary supporting means and located on the same side of the median plane as said axis.

4. The combination with a car-body, an axle and a pair of wheels carried thereby; of supporting means for a car-body intervening between said car-body and the axle, said means including a pivotal support located at one side of the median plane between said wheels and axle, a traveling support on the other side of said median plane, and an auxiliary support located at each side of the pivotal support and on the same side of the car-body as the pivotal support; the said auxiliary supports being so disposed as to prevent rocking or tilting movement of the car-body with relation to the pivotal support, or vice versa, while permitting swinging movements of the car-body relative to the axle about said pivotal support.

5. The combination with a car-body, of a truck having an axle and wheels carried thereby, said truck being provided with supporting means for the car-body, including a pivotal support having a substantially definite vertical axis at one side of said truck and a traveling support at the other side of said truck; brackets carried by said truck on the same side thereof as the pivotal support; brackets carried by the car-body and located adjacent to the brackets on said truck; and means for connecting said brackets respectively carried by the truck and car-body, said means being so constructed as to prevent rocking or tilting movement of the car-body with relation to said pivotal support, or vice versa, while permitting swinging movement of the car-body relative to the truck, about said pivotal support as an axis.

6. The combination with a car-body, of a truck having an axle and wheels carried thereby, said truck being provided with supporting means for the car-body, including a pivotal support having a substantially definite vertical axis on one side of the truck and a traveling support on the other side of the truck; brackets carried by the truck on the same side thereof as the pivotal support; brackets carried by the car-body and located adjacent to the brackets on the truck; links interposed between the brackets on the truck and the brackets on the car-body; said links having a universal connection with the brackets, whereby the truck is held from rocking or tilting on the pivotal support and is permitted to turn relatively to the car-body about said pivotal support as an axis.

In testimony whereof, I have hereunto signed my name at Philadelphia, Pennsylvania, this first day of November 1912.

JAMES T. HALSEY.

Witnesses:
  JAMES H. BELL,
  E. L. FULLERTON.